(12) United States Patent
Petrany et al.

(10) Patent No.: US 10,949,685 B2
(45) Date of Patent: Mar. 16, 2021

(54) EXCLUDING A COMPONENT OF A WORK MACHINE FROM A VIDEO FRAME BASED ON MOTION INFORMATION

(71) Applicant: Caterpillar Inc., Deerfield, IL (US)

(72) Inventors: Peter Petrany, Dunlap, IL (US); Jacob C. Maley, Germantown Hills, IL (US); Vamsi Pannala, Peoria, IL (US); Robert Scott McFarland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/518,777

(22) Filed: Jul. 22, 2019

(65) Prior Publication Data

US 2021/0027072 A1    Jan. 28, 2021

(51) Int. Cl.
| | |
|---|---|
| *G06T 7/00* | (2017.01) |
| *G06K 9/00* | (2006.01) |
| *G06T 7/246* | (2017.01) |
| *G06T 7/269* | (2017.01) |
| *G06T 11/00* | (2006.01) |
| *G06K 9/44* | (2006.01) |
| *G06T 5/00* | (2006.01) |

(52) U.S. Cl.
CPC ........... *G06K 9/00805* (2013.01); *G06K 9/44* (2013.01); *G06T 5/002* (2013.01); *G06T 7/246* (2017.01); *G06T 7/269* (2017.01); *G06T 11/001* (2013.01); *G06T 2207/10016* (2013.01); *G06T 2207/10024* (2013.01); *G06T 2207/20221* (2013.01); *G06T 2207/30261* (2013.01)

(58) Field of Classification Search
CPC ................ G06T 7/00; G06T 5/00; G06K 9/00
See application file for complete search history.

(56) References Cited

U.S. PATENT DOCUMENTS

| | | |
|---|---|---|
| 9,115,482 B2 | 8/2015 | Hargrave, Jr. et al. |
| 9,463,741 B2 | 10/2016 | Fukuda et al. |
| 9,739,038 B2 | 8/2017 | Baba et al. |
| 9,796,330 B2 | 10/2017 | Mitsuta et al. |
| 9,990,543 B2 | 6/2018 | Fukuda et al. |

(Continued)

FOREIGN PATENT DOCUMENTS

| | | | |
|---|---|---|---|
| JP | 4951639 B2 | 6/2012 | |
| JP | 5995899 B2 | 9/2016 | |

(Continued)

*Primary Examiner* — Maryam A Nasri
(74) *Attorney, Agent, or Firm* — Harrity & Harrity LLP (57) ABSTRACT

A controller may process a plurality of video frames to determine an apparent motion of each pixel of one or more pixels or each group of pixels of one or more groups of pixels of each video frame of the plurality of video frames. The controller may select one or more processed video frames, of the plurality of processed video frames, that correspond to a duration of time and may generate a composite video frame based on the one or more processed video frames. The controller may generate a video frame mask based on the composite video frame and may obtain additional video data that includes at least one additional video frame. The controller may cause the video frame mask to be applied to the at least one additional video frame and may cause the at least one additional video frame to be processed using an object detection technique.

20 Claims, 5 Drawing Sheets

(56) References Cited

U.S. PATENT DOCUMENTS

| | | |
|---|---|---|
| 10,160,383 B2 | 12/2018 | Onuma et al. |
| 2014/0088824 A1 | 3/2014 | Ishimoto |
| 2015/0002745 A1* | 1/2015 | Bernal ............... G06K 9/00785 348/575 |
| 2015/0310274 A1 | 10/2015 | Shreve et al. |
| 2016/0200252 A1 | 7/2016 | Oota et al. |
| 2016/0358022 A1 | 12/2016 | Dziurda |
| 2017/0345164 A1 | 11/2017 | Guerreiro et al. |
| 2017/0352275 A1 | 12/2017 | Maruyama et al. |
| 2018/0084708 A1 | 3/2018 | Neitemeier et al. |
| 2018/0209122 A1* | 7/2018 | Kiyota ...................... E02F 9/24 |
| 2018/0222390 A1 | 8/2018 | Imaizumi et al. |
| 2019/0068829 A1 | 2/2019 | Van Schoyck et al. |
| 2019/0080196 A1 | 3/2019 | Choi et al. |

FOREIGN PATENT DOCUMENTS

| | | |
|---|---|---|
| JP | 2018064191 A | 4/2018 |
| WO | 2018025512 A1 | 2/2018 |

* cited by examiner

EXCLUDING A COMPONENT OF A WORK MACHINE FROM A VIDEO FRAME BASED ON MOTION INFORMATION

TECHNICAL FIELD

The present disclosure relates generally to processing video data and to a controller for processing video data to exclude a component of a work machine from a video frame based on motion information.

BACKGROUND

In a variety of work industries (e.g., construction, material movement, mining, hauling, and the like), objects in a vicinity or within a path of work machines on a worksite may disrupt working operations of the work machines. Further, such objects may cause damage to the work machine, or other work machines operating on the worksite, if the objects come in contact with the work machine. Accordingly, object detection is often used to ensure that existence of objects lying in the vicinity of a work machine on a worksite, in which the work machine operates, is known to an operator of the work machine.

One attempt to monitor the surroundings of a work machine is disclosed in U.S. Patent Application Publication No. 2018/0209122 that was filed by Sumitomo Heavy Industries, Ltd. on Mar. 19, 2018 ("the '122 publication"). In particular, the '122 publication discloses a controller receiving outputs of an image capturing apparatus and executing software programs to correspond to an extracting part and an identifying part of the controller. Per the '122 publication, the extracting part extracts an identification process target image, which is a partial image (e.g., a part of a captured image) to be subjected to subsequent image processing. As disclosed in the '122 publication, the extracting part masks identification process unsuitable regions (e.g., a region in which a body of a shovel of the work machine is captured) of a target image region of the target image to generate a normalized image of the target image. Thus, per the '122 publication, by masking the image of an identification unsuitable region, the extracting part prevents an image of the identification process unsuitable region from affecting an identification process by the identifying part. According to the '122 publication, this makes it possible for the identifying part to identify whether it is a person image, using the image of a region other than a masked region in a normalized image without being affected by the image of an identification process unsuitable region.

While the controller of the '122 publication may mask an identification unsuitable region of a target image, the '122 publication does not disclose how the controller identifies the identification unsuitable region. Furthermore, the '122 publication does not address identifying regions, which are associated with a moving implement (e.g., a shovel) of the work machine, in a stream of target images.

The controller of the present disclosure solves one or more of the problems set forth above and/or other problems in the art.

SUMMARY

According to some implementations, a method may include obtaining, by a device, video data that includes a plurality of video frames; processing, by the device, the plurality of video frames to determine an apparent motion of each pixel of one or more pixels or each group of pixels of one or more groups of pixels of each video frame of the plurality of video frames; selecting, by the device, one or more processed video frames, of the plurality of processed video frames, that correspond to a duration of time; generating, by the device, a composite video frame based on the one or more processed video frames; generating, by the device, a video frame mask based on the composite video frame; obtaining, by the device, additional video data that includes at least one additional video frame; causing, by the device, the video frame mask to be applied to the at least one additional video frame; and causing, by the device, the at least one additional video frame to be processed using an object detection image processing technique and based on causing the video frame mask to be applied to the at least one additional video frame.

According to some implementations, a device may include one or more memories; and one or more processors, communicatively coupled to the one or more memories, configured to: one or more processors, communicatively coupled to the one or more memories, to: obtain video data that includes a plurality of video frames; process the plurality of video frames to determine an apparent motion of each pixel of one or more pixels or each group of pixels of one or more groups of pixels of each video frame of the plurality of video frames; select one or more processed video frames, of the plurality of processed video frames, that correspond to a duration of time; generate a composite video frame based on the one or more processed video frames; determine at least one area of the composite video frame that is associated with at least one component of a work machine; generate a video frame mask based on the composite video frame and the at least one area of the composite video frame; obtain additional video data that includes at least one additional video frame; cause the video frame mask to be applied to the at least one additional video frame; and cause the at least one additional video frame to be processed using an object detection image processing technique and based on causing the video frame mask to be applied to the at least one additional video frame.

According to some implementations, a work machine may comprise an implement; a camera device; and a control device to: obtain video data that includes a plurality of video frames from the camera device; process the plurality of video frames to determine an apparent motion of each pixel of one or more pixels or each group of pixels of one or more groups of pixels of each video frame of the plurality of video frames; select one or more processed video frames, of the plurality of processed video frames, that correspond to a duration of time; generate a composite video frame based on the one or more processed video frames; obtain one or more control instructions or sensor data concerning motion of the implement or the work machine; generate a video frame mask based on the composite video frame and the one or more control instructions or the sensor data; obtain additional video data that includes at least one additional video frame from the camera device; cause the video frame mask to be applied to the at least one additional video frame; and cause the at least one additional video frame to be processed using an object detection image processing technique and based on causing the video frame mask to be applied to the at least one additional video frame.

DETAILED DESCRIPTION

Figure 1:
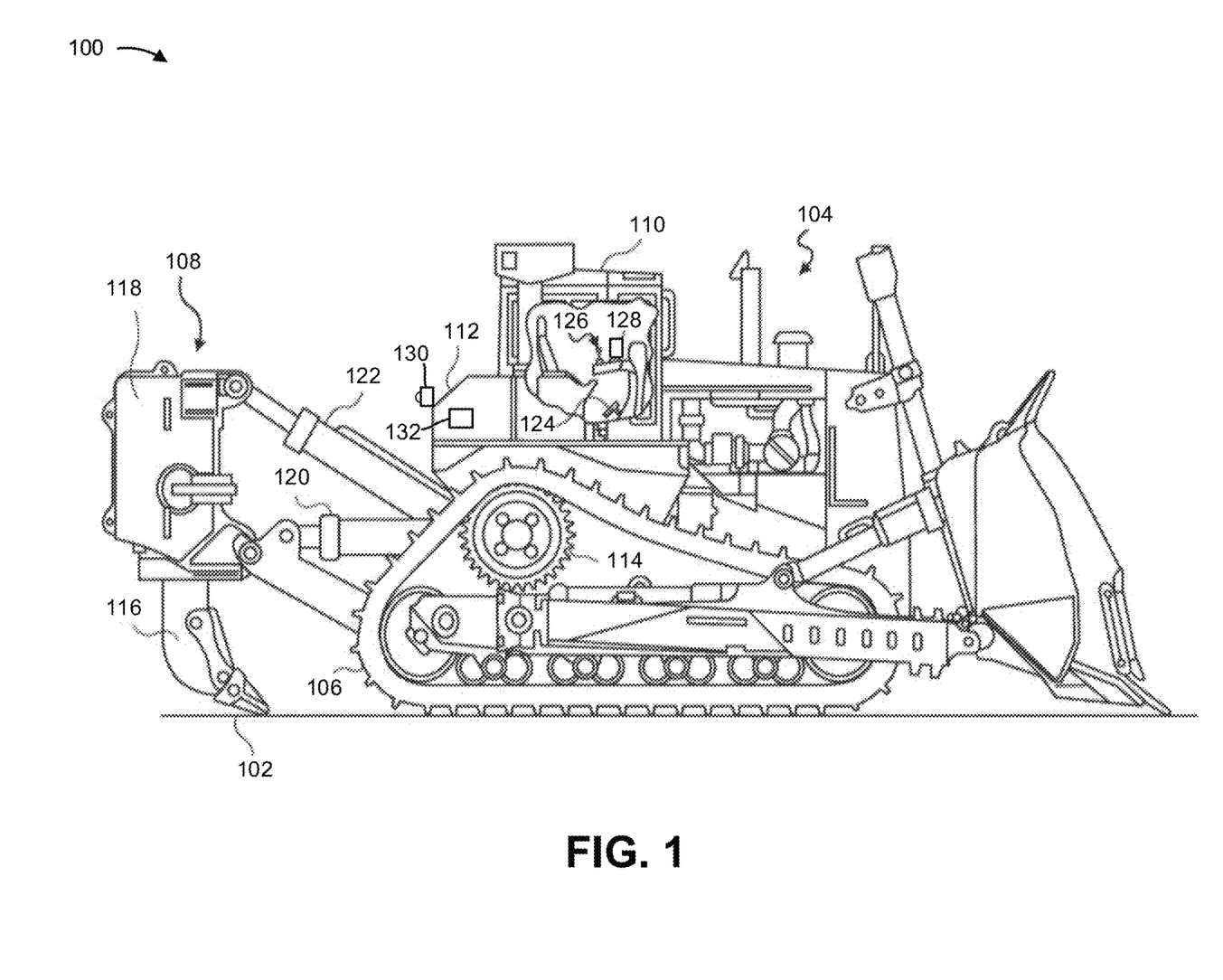
FIG. 1 is diagram of an example work machine described herein.

FIG. 1 is a diagram of an example work machine 100 described herein. The work machine 100 may include any machine that performs some type of operation associated with an industry, such as mining, construction, farming, and/or the like. For example, the work machine 100 may be an earth moving machine such as a dozer, a loader, a backhoe, an excavator, a motor grader, or any other earth moving machine. The work machine 100 may traverse a work site to manipulate material beneath a work surface 102 (e.g., transport, cultivate, dig, rip, and/or the like). The work machine 100 may include a power source 104 configured to produce mechanical power, a traction device 106, at least one implement 108 (e.g., at least one material engaging element, such as a ripper), and an operator station 110 to house operator controls. The work machine 100 may additionally include a frame 112 configured to support one or more components of the work machine 100.

The power source 104 may be any type of internal combustion engine, such as a diesel engine, a gasoline engine, or a gaseous fuel-powered engine. Further, the power source 104 may be a non-engine type of power producing device, such as a fuel cell, a battery, a motor, or another type of power source. The power source 104 may produce a variable power output directed to the implement 108 and the traction device 106 in response to one or more inputs.

The traction device 106 may include tracks located on each side of the work machine 100 (only one side shown) and operatively driven by one or more sprockets 114. The sprockets 114 may be operatively connected to the power source 104 to receive power therefrom and drive the traction device 106. Movement of the traction device 106 may propel the work machine 100 with respect to the work surface 102. The traction device 106 may additionally or alternatively include wheels, belts, or other traction devices, which may or may not be steerable. The traction device 106 may be hydraulically actuated, mechanically actuated, electronically actuated, or actuated in any other suitable manner.

The implement 108 may be configured to lift, lower, and tilt relative to the frame 112. For example, when the implement 108 is a ripper, implement 108 may include a shank 116 held in place by a mounting member 118. The shank 116 may penetrate the work surface 102 to disturb or disrupt (e.g., rip) the material below the work surface 102, and may move relative to the mounting member 118. The mounting member 118 may be connected to the frame 112 via a linkage system with at least one implement actuator forming a member in the linkage system, and/or in any other suitable manner. For example, a first hydraulic actuator 120 may be connected to lift and lower the implement 108, and a second hydraulic actuator 122 may be connected to tilt the implement 108. The implement 108 may alternatively include a plow, a tine, a cultivator, and/or the like.

Hydraulic actuators 120 and 122 may each include a piston-cylinder arrangement, a hydraulic motor, and/or another known hydraulic device having one or more fluid chambers therein. The movement of the hydraulic actuator 120 may assist in moving the implement 108 with respect to the frame 112 and the work surface 102, such as down toward and up away from the work surface 102. An extension of the hydraulic actuator 120 may correlate to a position of the implement 108 with respect to the work surface 102. Similarly, an extension of the hydraulic actuator 122 may correlate to an orientation of the implement 108 with respect to the frame 112 and/or the work surface 102, such as decreasing or increasing the angle of the implement 108 relative to the work surface 102.

The operator station 110 may provide a control interface for an operator of the work machine 100. For example, the operator station 110 may include an acceleration pedal 124, an implement control 126, and/or an output device 128. Although not shown, the operator station 110 may additionally include other controls, such as a machine direction control, a deceleration pedal, and/or any other similar control device. The acceleration pedal 124 may determine the amount of mechanical power delivered to the traction device 106 to move the traction device 106.

The implement control 126 may allow an operator of the work machine 100 to manipulate the implement 108. More specifically, the implement control 126 may control an amount or a pressure of fluid supplied to and drained from the hydraulic actuators 120 and 122. Thus, the implement control 126 may allow the operator to set a height of the shank 116 above or below work surface 102 and set an angle of the shank 116 relative to the work surface 102. The implement control 126 may also allow the operator to change the angle of the shank 116 relative to the work surface 102 while the shank 116 is above or below the work surface 102.

The output device 128 may include an audio output device, a vibratory output device, a visual display, and/or the like. The audio output device may be any audio device capable of providing an audible signal to an operator of the work machine 100, such as a speaker. The visual display may be a screen or any visual device which may be configured to provide the operator with any form of visual stimuli or a visual feed. While the visual display is depicted in FIG. 1 as being within the work machine 100, the visual display may be off board with respect to the work machine 100 (e.g., at a remote operator station) or in any location suitable to being seen by the operator or any other user. Further, the vibratory output device may be any vibratory and/or haptic device configured to alert the operator via one or more vibrations.

The work machine 100 may include one or more sensing devices 130 (referred to singularly as "sensing device 130" and collectively as "sensing devices 130"), a controller 132, and/or one or more sensors 134 (not shown in FIG. 1, referred to singularly as "sensor 134" and collectively as "sensors 134"). The sensing device 130 may be operatively associated with the work machine 100, by, for example, mounting or otherwise attaching the sensing device 130 to the work machine 100. However, the sensing device 130 need not be attached to the work machine 100 and may be positioned relative to the work machine 100 in any fashion in which the sensing device 130, in operation, can obtain sensing data associated with a zone proximate to the work machine 100. The sensing device 130 may include a camera device, a radar device, a light detection and ranging (lidar device), a sonar device, and/or the like.

The sensors 134 may be operatively associated with the work machine 100, and/or a component of the work machine 100 by, for example, mounting or otherwise attaching the sensors 134 to the work machine 100 and/or the component of the work machine 100. In an example, the sensors 134 may include a global positioning system (GPS) device, an inertial measurement unit (IMU) device, and/or the like and may obtain sensor data regarding a location, a heading, a position, an orientation, an acceleration, a specific force, and/or the like of the machine 100 and/or the component of work machine 100. In an additional example, the sensors 134 may be associated with one or more sprockets 114 and/or traction device 106 and may obtain sensor data regarding traction device or sprocket speed, traction device or sprocket slippage, and/or the like. In another example, the sensors 134 may be associated with implement 108 and may obtain sensor data regarding a height, an angle, a torque, a load, and/or the like of implement 108.

The sensing device 130 may be configured to transmit the sensing data to, for example, the controller 132; however, the sensing device 130 is not limited to only transmitting the sensing data to the controller 132 and may additionally or alternatively transmit the sensing data to any additional or alternative controller (e.g., included on the work machine 100, located remotely with respect to the work machine 100, and/or the like). In some implementations, the sensing device 130 may include the controller 132 or the controller 132 may include the sensing device 130. Similarly, the sensors 134 may be configured to transmit the sensor data to the controller 132 or any additional or alternative controller.

The controller 132 may be configured to process the sensing data and/or the sensor data. The controller 132 may be implemented in hardware, firmware, or a combination of hardware and software. Further functionality of the controller 132 is described herein in relation to FIG. 2.

The number and arrangement of components shown in FIG. 1 are provided as an example. In practice, work machine 100 may include additional components, fewer components, different components, or differently arranged components than those shown in FIG. 1. A set of components (e.g., one or more components) of work machine 100 may perform one or more functions described as being performed by another set of components of work machine 100.

Figure 2:
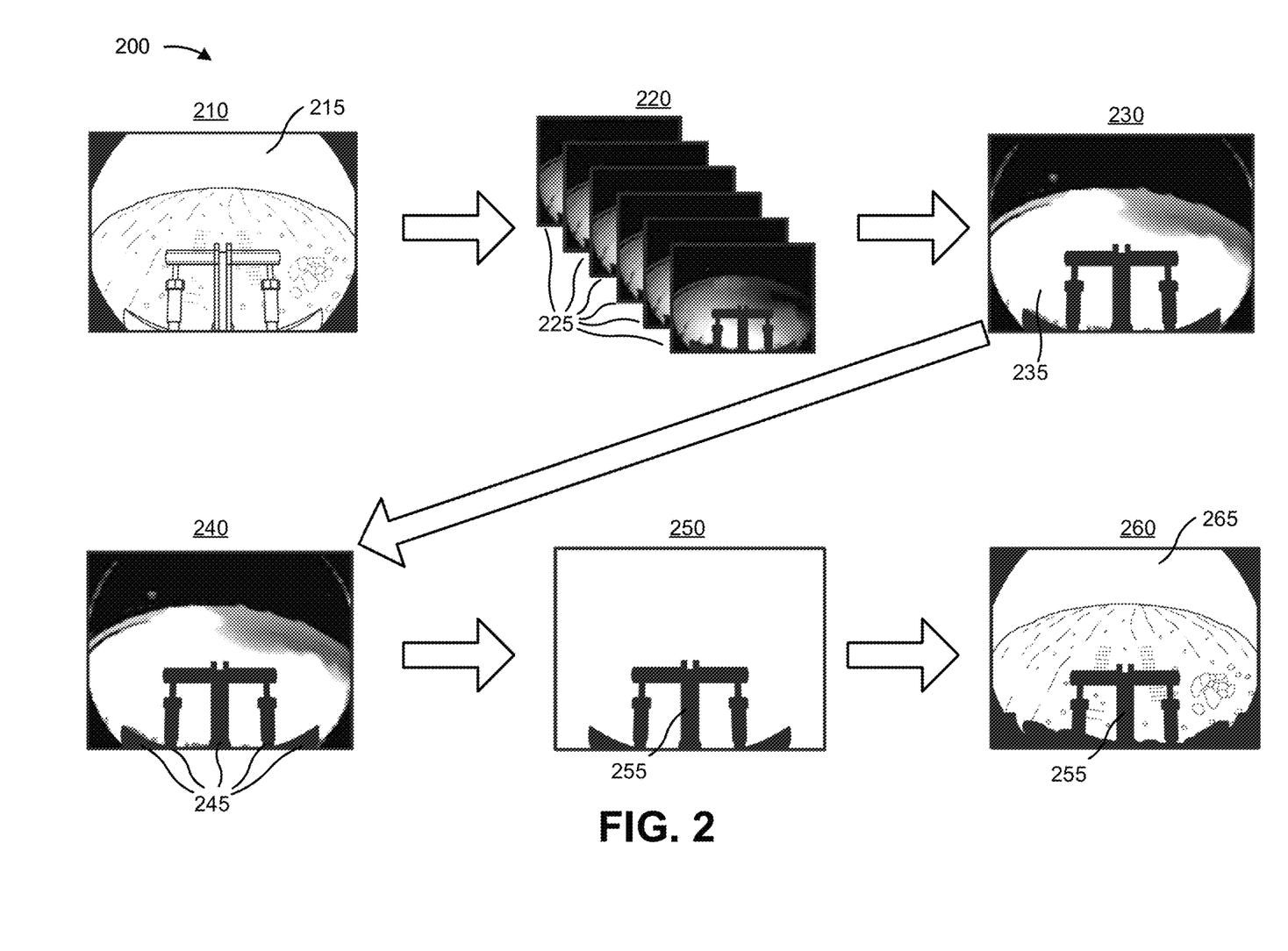
FIG. 2 is a flow diagram that graphically illustrates a process for excluding a component of a work machine from a video frame based on motion information as described herein.

FIG. 2 is a flow diagram that graphically illustrates a process 200 for excluding a component of a work machine from a video frame based on motion information as described herein. In some implementations, one or more operations of FIG. 2 may be performed by the controller 132 alone or in combination with another device, such as output device 128, sensing device 130, and/or the like.

In connection with reference number 210, the controller 132 may obtain sensing data from the sensing device 130. The sensing data may be data associated with a type of the sensing device 130. For example, when the sensing device 130 is a camera device, the sensing data may be video data. Similarly, when the sensing device 130 is a radar device, a lidar device, a sonar device, and/or the like, the sensing data may be radar data, lidar data, sonar data, and/or the like. The sensing data may include one or more sensing elements (also referred to as frames). For example, the video data may include a plurality of video frames (e.g., a single video frame 215 is shown in connection with reference number 210), the radar data may include a plurality of radar frames, the lidar data may include a plurality of lidar frames, the sonar data may include a plurality of sonar frames, and/or the like. While some implementations described herein concern operations associated with video data and video frames, implementations concerning similar operations associated with other types of sensing data and/or sensing elements are contemplated as well.

In connection with reference number 220, the controller 132 may process one or more video frames (e.g., shown as one or more processed video frames 225) of the plurality of video frames. The controller 132 may process a video frame to determine an apparent motion of each pixel of one or more pixels of the video frame and/or an apparent motion of each group of pixels of one or more pixels of the video frame. The apparent motion of a pixel may include a magnitude and/or direction of movement of the pixel, as compared to a corresponding pixel in another video frame. The magnitude may be a difference in position of the pixel and a position of the corresponding pixel (e.g., measured using horizontal coordinates and/or vertical coordinates of the pixel and the corresponding pixel) and the direction may be the position of the pixel relative to the position of the corresponding pixel (e.g., measured in degrees). Similarly, the apparent motion of a group of pixels may include a magnitude and/or direction of movement of the group of pixels, as compared to a corresponding group of pixels in another video frame. The magnitude may be a difference in position of the group of pixels and a position of the corresponding group of pixels and the direction may be the position of the group of pixels relative to the position of the corresponding group of pixels.

For example, the controller 132 may compare a first video frame and a second video frame (e.g., adjacent video frames), of the one or more video frames, to determine an apparent motion of at least one pixel, at least one group of pixels, and/or the like in the second video frame. The controller 132 may identify the at least one pixel, the at least one group of pixels, and/or the like in the second video frame and search for a corresponding at least one pixel, a corresponding at least one group of pixels, and/or the like in the first video frame (e.g., by searching for pixels, groups of pixels, and/or the like in the first video frame associated with one or more similar parameters (e.g., a pixel color value, a pixel luminance value, a pixel group color value, a pixel group luminance value, and/or the like) as the at least one pixel, the at least one group of pixels, and/or the like in the second video frame). The controller 132 may compare a position of the at least one pixel, the at least one group of pixels, and/or the like in the second video frame and a position of the corresponding at least one pixel, the corresponding at least one group of pixels, and/or the like in the first video frame to determine the apparent motion (e.g., the magnitude and/or direction of movement) of the at least one pixel, the at least one group of pixels, and/or the like in the second video frame.

In some implementations, the controller 132 may process a video frame using an optical flow image processing technique, such as a dense optical flow image processing technique (e.g., a Lucas-Kanade image processing technique), a coarse optical flow image processing technique (e.g., a Black-Jepson image processing technique), and/or the like to determine an apparent motion of one or more pixels (e.g., an apparent motion of one pixel, an apparent motion of a group of pixels, and/or the like) of the video frame. When using an optical flow image processing technique, the apparent motion of a pixel, a group of pixels, and/or the like is also referred to as a flow component of the pixel, the group of pixels, and/or the like.

After determining the apparent motion of a pixel, a group of pixels, and/or the like of a video frame, the controller 132 may cause a parameter, such as a pixel color value, a pixel luminance value, a pixel group color value, a pixel group luminance value, and/or the like associated with the pixel, the group of pixels, and/or the like to change. For example, the controller 132 may cause the pixel color value of the at least one pixel to change to a value that represents the magnitude and/or direction of movement of the at least one pixel (e.g., a dark green may indicate a high magnitude, leftward movement; a light green may indicate a low magnitude, leftward movement; a light red may indicate a low magnitude, rightward movement; a dark red may indicate a high magnitude, rightward movement; and/or the like).

In some implementations, the controller 132 may select one or more of the processed video frames. For example, the controller 132 may select one or more processed video frames that correspond to a duration of time (e.g., the one or more processed video frames were sequentially generated during a one second duration of time, a ten second duration of time, a minute duration of time, and/or the like).

In connection with reference number 230, the controller 132 may generate a composite video frame (e.g., shown as composite video frame 235) based on the selected one or more processed video frames (e.g., the one or more processed video frames that correspond to the duration of time). To generate a pixel, a group of pixels, and/or the like of the composite video frame, the controller 132 may identify a respective corresponding pixel, a respective corresponding group of pixels, and/or the like in each processed video frame of the selected one or more processed video frames (e.g., where each corresponding pixel, each corresponding group of pixels, and/or the like has the same respective position in each processed video frame as a position of the pixel, the group of pixels, and/or the like of the composite video frame). The controller 132 may identify a respective parameter value (e.g., a pixel color value, a pixel luminance value, a pixel group color value, a pixel group luminance value, and/or the like) of each corresponding pixel, each group of pixels, and/or the like and determine an average value of the respective parameter values. The controller 132 may cause the parameter value of the pixel, the group of pixels, and/or the like of the composite video to have a value equal to the average value. Accordingly, each pixel, each group of pixels, and/or the like of the composite video frame indicates an average apparent motion (e.g., an average magnitude and direction of movement) of the corresponding pixels, corresponding groups of pixels, and/or the like in the one or more processed video frames. In this way, the composite video frame may indicate motion (e.g., an average apparent motion) associated with the one or more processed video frames for the duration of time.

In connection with reference number 240, the controller 132 may determine at least one area (e.g., shown as one or more areas 245 in FIG. 2) of the composite video frame. The at least one area may be associated with a lack of motion (e.g., a respective parameter of each pixel, each group of pixels, and/or the like of the at least one area has a value that indicates little to no apparent motion). Accordingly, when at least one component of the work machine 100, such as the implement 108, the frame 112, and/or the like, appears to be motionless with respect to the environment in the one or more processed video frames used to generate the composite video frame, the at least one area may be associated with the at least one component of the work machine 100. To determine the at least one area of the composite video frame, the controller 132 may identify at least one pixel, at least one group of pixels, and/or the like of the composite video frame that has a parameter value, such as pixel color value, a pixel group color, and/or the like, within a particular range, such as a particular color range (e.g., a color value range that indicates little to no apparent motion of the pixel, the group of pixels, and/or the like), and may determine the at least one area of the composite video frame based on the parameter value of the at least one pixel, the at least one group of pixels, and/or the like.

Additionally, or alternatively, the controller 132 may obtain information concerning motion of the work machine 100 (e.g., one or more control instructions generated by the accelerator pedal 124 and/or a deceleration pedal concerning motion of the work machine 100, such as a speed or acceleration of the work machine 100; one or more control instructions generated by a machine direction control concerning motion of the work machine 100, such as a turn direction of the work machine 100; sensor data obtained by the sensors 134 concerning motion of the work machine 100, such as a location, a heading, a position, an orientation, an acceleration, a specific force, and/or the like of the machine 100, and/or the like). Moreover, the controller 132 may obtain information concerning motion of at least one component of the work machine (e.g., one or more control instructions generated by the implement control 126 concerning motion of the implement 108, such as a change in height or angle of the implement 108; one or more control instructions generated by the acceleration pedal 124 and/or a deceleration pedal concerning motion of the traction device 106, such as a speed or acceleration of traction device 106; sensor data obtained by the sensors 134 concerning motion of one or more sprockets 114 and/or traction device 106, such as traction device or sprocket speed and/or traction device or sprocket slippage; sensor data obtained by the sensors 134 concerning motion of implement 108, such as a change in height, an angle, a torque, a load, and/or the like of implement 108; and/or the like). In some implementations, the controller 132 may determine the at least one area of the composite video frame based on the information concerning motion of the work machine 100, the information concerning motion of the at least one component, and/or the like. The at least one area of the composite video frame may include one or more pixels, one or more groups of pixels, and/or the like that each indicates an apparent motion (e.g., a magnitude and/or direction of movement) that corresponds to the information concerning motion of the work machine 100, the information concerning motion of the at least one component, and/or the like.

For example, the controller 132 may determine a magnitude and direction of motion of the at least one component (e.g., the implement 108 is being raised or lowered at a particular speed) based on the information concerning motion of the at least one component. The controller 132 may determine the at least one area of the composite video frame by identifying one or more areas of the composite video frame that have respective pixels, respective groups of pixels, and/or the like that indicate an apparent motion (e.g., a magnitude and/or direction of movement) that corresponds to the magnitude and direction of motion of the at least one component (e.g., the pixels, the groups of pixels, and/or the like indicate a magnitude and direction of movement that correlates to the implement 108 being raised or lowered at the particular speed). As another example, the controller 132 may determine a magnitude and direction of motion of the work machine 100 (e.g., a direction and speed of travel of the work machine 100) based on the information concerning motion of the work machine 100 and may determine a magnitude and direction of motion of the at least one component (e.g., a direction and speed of the traction device 106) based on the information concerning motion of the at least one component. The controller 132 may determine the at least one area of the composite video frame by identifying one or more areas of the composite video frame that have respective pixels, respective groups of pixels, and/or the like that indicate an apparent motion (e.g., a magnitude and/or direction of movement) that corresponds to the magnitude and direction of motion of the at least one component (e.g., the pixels, the groups of pixels, and/or the like indicate a magnitude and direction of movement that correlates to the direction and speed of the traction device 106) and/or do not correspond to the magnitude and direction of motion of the work machine 100 (e.g., the pixels, the groups of pixels, and/or the like indicate a magnitude and direction of movement that does not correlate to the direction and speed of the work machine 100). Further examples concerning the controller 132 determining the at least one area is described herein in relation to FIG. 3.

In connection with reference number 250, the controller 132 may generate a video frame mask (e.g. shown in FIG. 2 as video frame mask 255) based on the composite video frame, the at least one area of the composite video frame, the information concerning motion of the work machine 100, the information concerning motion of the at least one component, and/or the like. To generate the video frame mask, the controller 132 may generate a video frame that includes a plurality of pixels and cause, for each pixel, each group of pixels, and/or the like of the plurality of pixels that corresponds to the at least one area of the composite video frame, a parameter of the pixel, the group of pixels, and/or the like to be associated with a particular value. For example, the controller 132 may cause a pixel color value of the pixel to be associated with a particular color, such as black. As another example, the controller 132 may cause a pixel luminance value of the pixel to be associated with a particular amount of luminance, such as an absence of luminance.

In some implementations, the controller 132 may ignore portions of the composite video frame when generating the video frame mask. For example, the controller 132 may ignore a portion of the composite video frame associated an upper portion of the composite video frame (e.g. to ignore pixels, groups of pixels, and/or the like associated with the sky). Accordingly, in some implementations, to generate the video frame mask, the controller 132 may generate a video frame that includes a plurality of pixels and cause, for each pixel, each group of pixels, and/or the like of the plurality of pixels that corresponds to the at least one area of the composite video frame and does not correspond to an ignored portion of the composite video frame, a parameter of the pixel to be associated with a particular value, in a similar manner as described herein.

In connection with reference number 260, the controller 132 may obtain additional video data from the sensing device 130. The additional video data may include at least one additional video frame (shown in FIG. 2 as additional video frame 265) that includes one or more pixels. The controller 132 may cause the video frame mask to be applied to the at least one additional video frame (e.g., combine the at least one additional video frame and the video frame mask).

To apply the video frame mask to the at least one additional video frame, the controller 132 may identify at least one pixel, at least one group of pixels, and/or the like of the at least one additional video frame that corresponds to at least one pixel, the group of pixels, and/or the like of the video frame mask (e.g., the at least one pixel, the at least one group of pixels, and/or the like of the at least one additional video frame has a position in the at least one additional video frame that is the same as a position of the at least one pixel, the at least one group of pixels, and/or the like of the video frame mask in the video frame mask). The controller 132 may cause a parameter value associated with the at least one pixel, the at least one group of pixels, and/or the like of the at least one additional video frame to change. For example, the controller 132 may cause a luminance value of the at least one pixel, the at least one group of pixels, and/or the like to have a particular value (e.g., a luminance value associated with a particular amount of luminance, such as an absence of luminance). As another example, the controller 132 may cause a color value of the at least one pixel, the at least one group of pixels, and/or the like to have a particular value (e.g., a color value associated with a particular color, such as black).

In an additional example, the controller 132 may cause at least one area of the at least one additional video frame that corresponds to the video frame mask to have a particular color, such as black, and/or may cause one or more edges of the at least one area to be blurred (e.g., cause the one or more edges to be gradated from black to gray).

In some implementations, after applying the video frame mask to the at least one additional video frame, the controller 132 may cause the at least one additional video frame to be processed using an object detection image processing technique (e.g., based on causing the video frame mask to be applied to the at least one additional video frame). For example, the controller 132 may process the at least one additional video frame using an object detection image processing technique (e.g., a Viola-Jones object detection technique, a scale-invariant feature transform technique, and/or the like) to detect an object (e.g., another work machine, another vehicle, a person, a building, and/or the like). The controller 132 may determine (e.g., based on the information concerning motion of the work machine 100, the information concerning motion of the at least one component, and/or the like) whether the object is in a path of motion of the work machine 100 or the component (e.g., the implement 108).

The controller 132 may cause, based on determining that the object is in the path of motion of the work machine 100 or the component, an alert to be presented via output device 128. For example, the controller 132 may send an alert signal or message to the output device 128 that causes the output device 128 to emit an audible alert via the audio output device of the output device 128, display a visual alert via the visual display of the output device 128, generate a vibratory alert via the vibratory output device of the output device 128, and/or the like. The audible alert, the visual alert, the vibratory alert, and/or the like may alert the operator of the work machine to alter the path of motion of the work machine 100 and/or the component to avoid colliding with the object.

Additionally, or alternatively, the controller 132 may cause, based on determining that the object is in the path of motion of the work machine 100 or the component, the motion of the work machine 100, the motion of the component, and/or the like to change. For example, the controller 132 may send a control signal to the acceleration pedal 124 to change an amount of mechanical power delivered to the traction device 106, which may change the path of motion of the work machine and/or the traction device 106. As another example, the controller 132 may send a control signal to the implement control 126 to change an amount of a pressure of fluid supplied to and drained from the hydraulic actuators 120 and 122, which may change the path of motion of the implement 108. Accordingly, the controller 132 may send one or more control signals to other controls, such as a machine direction control, a deceleration pedal, and/or the like to change the path of the work machine 100 and/or the component of the work machine 100.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

As indicated above, FIG. 2 is provided as an example. Other examples may differ from what is described in connection with FIG. 2.

Figure 3:
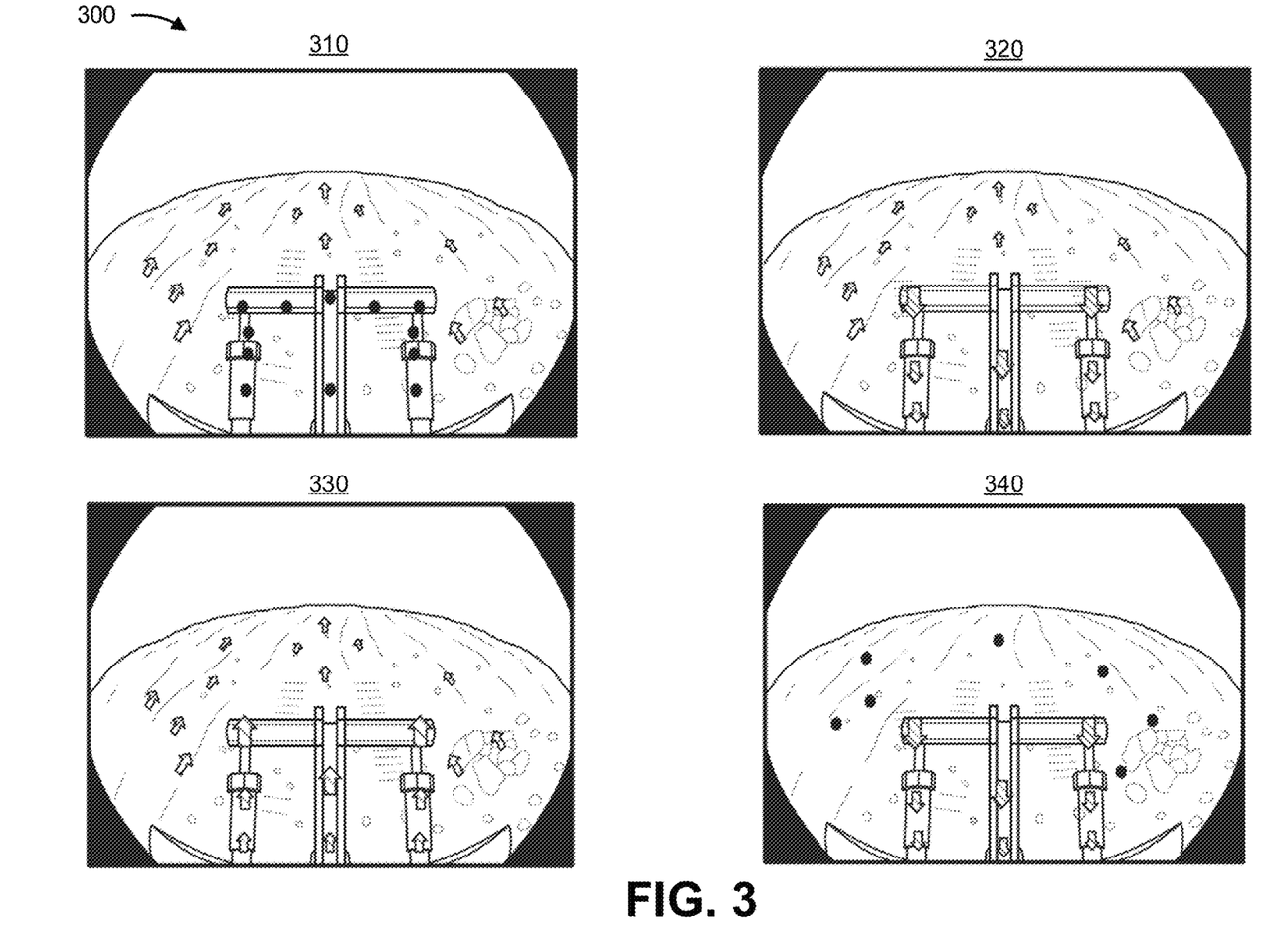
FIG. 3 is a diagram of example video frames.

FIG. 3 is a diagram 300 of example video frames that may be captured by the sensing device 130 and processed by the controller 132. In these examples, the sensing device 130 is attached to a rear of the working machine 100 and captures video frames that depict the implement 108 and a surrounding environment.

As shown in example video frame 310, the work machine 100 may move in a forward direction (e.g., indicated by arrows associated with the surrounding environment pointing in an upward direction) and the implement 108 may not be moving (e.g., indicated by dots). In this case, the operator may be engaging the accelerator pedal 124, but not implement control 126. In a similar manner as described herein, the controller 132 may generate a composite video frame based on the example video frame 310 and other similar video frames that correspond to a duration of time. The controller 132 may determine at least one area of the composite video frame that is associated with a lack of motion (e.g., at least one area associated with the dots) and generate a mask based on the at least one area.

As shown in example video frame 320, the work machine 100 may move in a forward direction (e.g., indicated by arrows associated with the surrounding environment pointing in an upward direction) and the implement 108 may be moving down (e.g., indicated by arrows associated with the implement 108 pointing in a downward direction). In this case, the operator may be engaging the accelerator pedal 124 and the implement control 126 at the same time. In a similar manner as described herein, the controller 132 may generate a composite video frame based on the example video frame 320 and other similar video frames that correspond to a duration of time. The controller 132 may determine at least one area of the composite video frame that is associated with information concerning motion of the implement 108 (e.g., at least one area associated with the downward pointing arrows) and/or not associated with information concerning motion of the work machine 100 (e.g., at least one area not associated with the upward pointing arrows). The controller 132 may generate a mask based on the at least one area.

As shown in example video frame 330, the work machine 100 may move in a forward direction (e.g., indicated by smaller arrows associated with the surrounding environment pointing in an upward direction) and the implement 108 may be moving up (e.g., indicated by larger arrows associated with the implement 108 pointing in an upward direction). In this case, the operator may be engaging the accelerator pedal 124 and the implement control 126 at the same time. As shown, the larger arrows indicate a greater magnitude of apparent motion (e.g., associated with the implement 108) than the magnitude of apparent motion indicated by the smaller arrows (e.g., associated with the surrounding environment). In a similar manner as described herein, the controller 132 may generate a composite video frame based on the example video frame 330 and other similar video frames that correspond to a duration of time. The controller 132 may determine at least one area of the composite video frame that is associated with information concerning motion of the implement 108 (e.g., at least one area associated with the larger arrows) and/or not associated with information concerning motion of the work machine 100 (e.g., at least one area not associated with the smaller arrows). The controller 132 may generate a mask based on the at least one area.

As shown in example video frame 340, the work machine 100 may be stationary (e.g., indicated by dots associated with the surrounding environment) and the implement 108 may be moving down (e.g., indicated by arrows associated with the implement 108 pointing in a downward direction). In this case, the operator may be engaging the implement control 126 but not the accelerator pedal 124. In a similar manner as described herein, the controller 132 may generate a composite video frame based on the example video frame 340 and other similar video frames that correspond to a duration of time. The controller 132 may determine at least one area of the composite video frame that is associated with information concerning motion of the implement 108 (e.g., at least one area associated with the downward pointing arrows) and/or not associated with information concerning motion of the work machine 100 (e.g., at least one area not associated with the dots). The controller 132 may generate a mask based on the at least one area.

Accordingly, with respect to example video frames 310, 320, 330, and 340, the controller 132 may generate a mask that can be used to exclude the implement 108 from additional video frames based on motion information concerning motion of the work machine 100, the information concerning motion of implement 108, and/or the like.

As indicated above, FIG. 3 is provided as an example. Other examples may differ from what is described in connection with FIG. 3.

Figure 4:
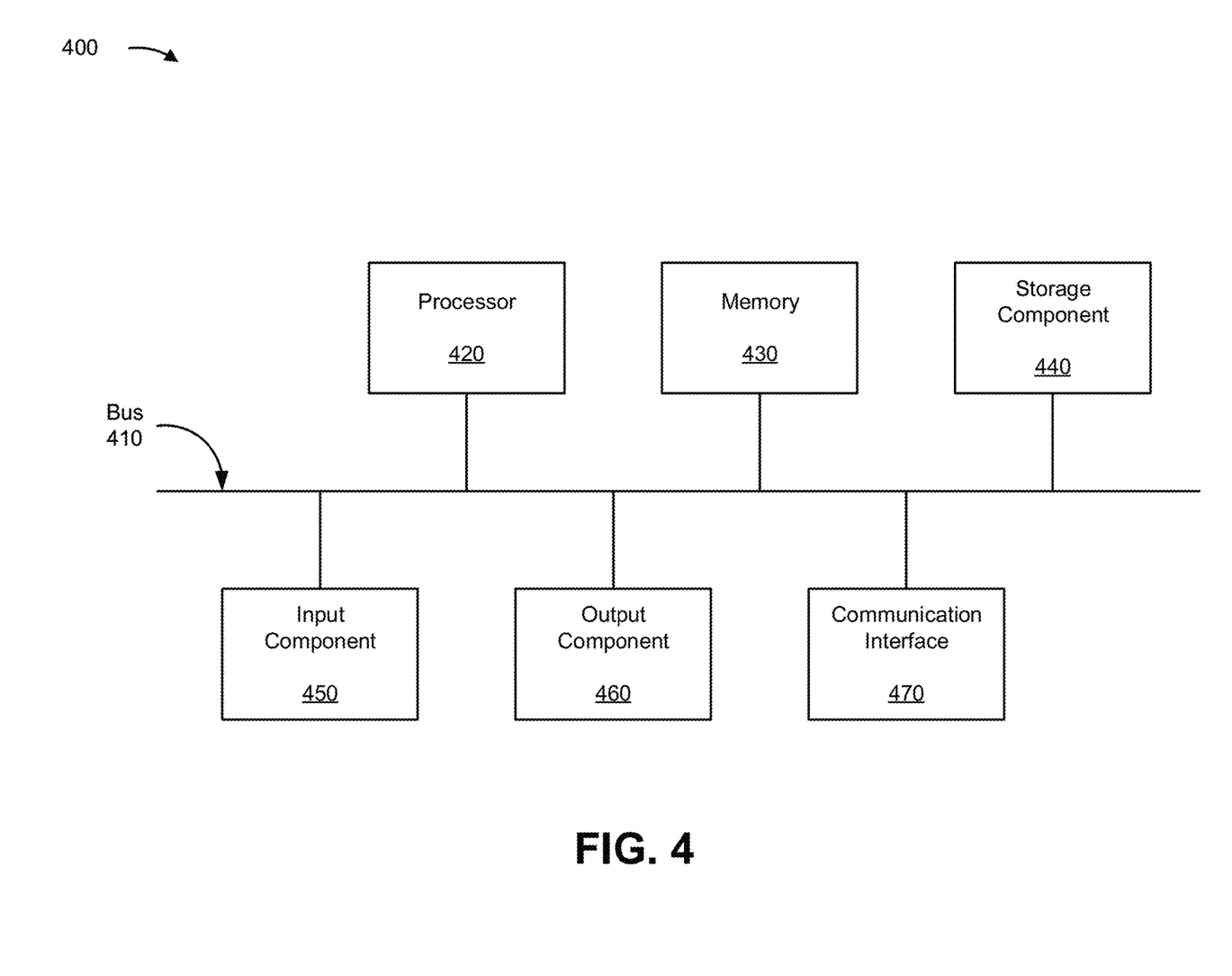
FIG. 4 is a diagram of example components of one or more devices of FIG. 1.

FIG. 4 is a diagram of example components of a device 400. Device 400 may correspond to output device 128, sensing device 130, and/or controller 132. In some implementations, output device 128, sensing device 130, and/or controller may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. A set of components (e.g., one or more components) of device 400 may perform one or more functions described as being performed by another set of components of device 400.

Figure 5:
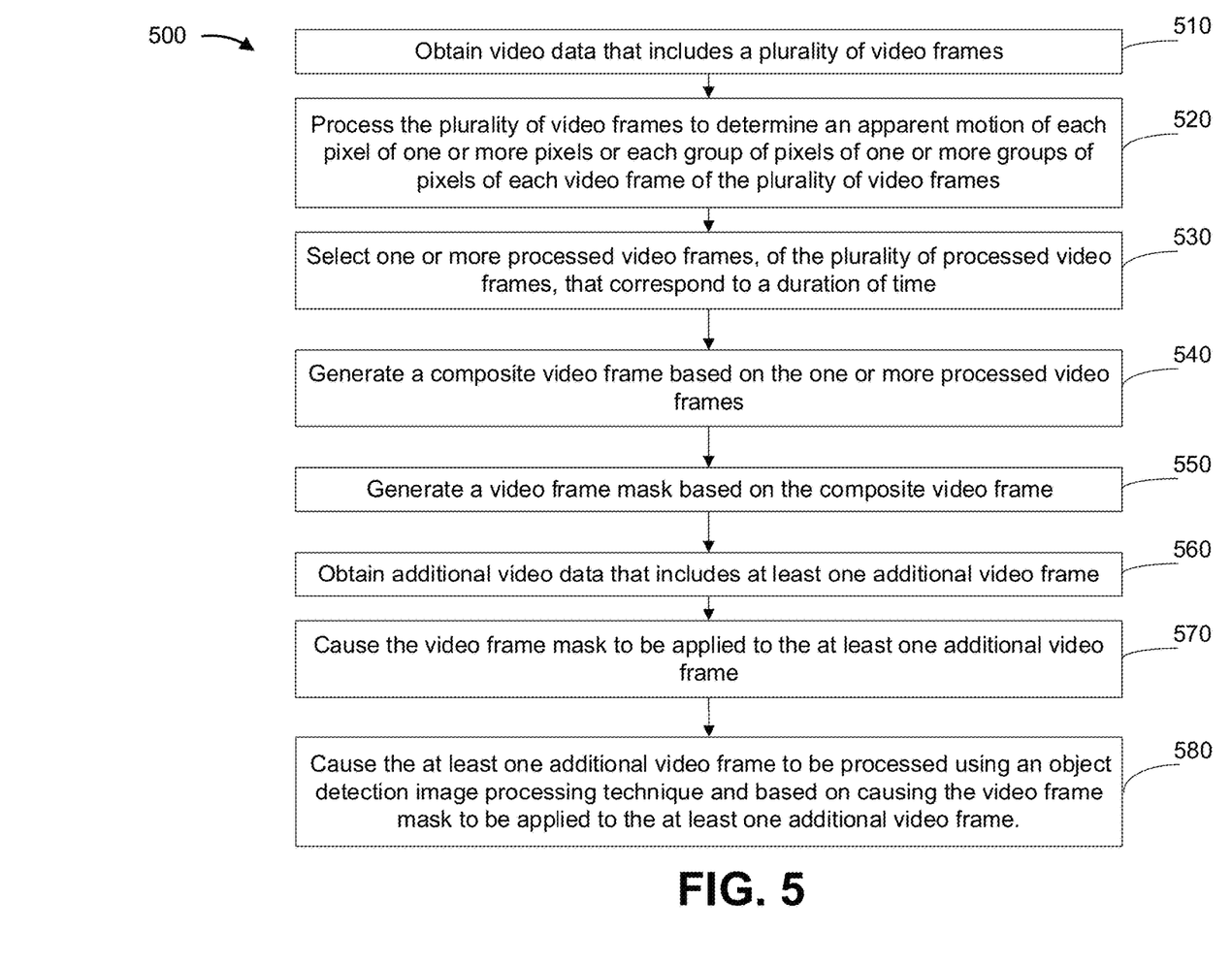
FIG. 5 is a flowchart of an example process for excluding a component of a work machine from a video frame based on motion information as described herein.

FIG. 5 is a flowchart of an example process 500 for excluding a component of a work machine from a video frame based on motion information. In some implementations, one or more process blocks of FIG. 5 may be performed by a controller (e.g., controller 132). In some implementations, one or more process blocks of FIG. 5 may be performed by another device or a group of devices separate from or including the controller, such as a sensing device (e.g., sensing device 130), an output device (e.g., output device 128), and/or the like.

As shown in FIG. 5, process 500 may include obtaining video data that includes a plurality of video frames (block 510). For example, the controller (e.g., using processor 420, memory 430, storage component 440, input component 450, output component 460, communication interface 470 and/or the like) may obtain video data that includes a plurality of video frames, as described above.

As further shown in FIG. 5, process 500 may include processing the plurality of video frames to determine an apparent motion of each pixel of one or more pixels or each group of pixels of one or more groups of pixels of each video frame of the plurality of video frames (block 520). For example, the controller (e.g., using processor 420, memory 430, storage component 440, input component 450, output component 460, communication interface 470 and/or the like) may process the plurality of video frames to determine an apparent motion of each pixel of one or more pixels or each group of pixels of one or more groups of pixels of each video frame of the plurality of video frames, as described above.

As further shown in FIG. 5, process 500 may include selecting one or more processed video frames, of the plurality of processed video frames, that correspond to a duration of time (block 530). For example, the controller (e.g., using processor 420, memory 430, storage component 440, input component 450, output component 460, communication interface 470 and/or the like) may select one or more processed video frames, of the plurality of processed video frames, that correspond to a duration of time, as described above.

As further shown in FIG. 5, process 500 may include generating a composite video frame based on the one or more processed video frames (block 540). For example, the controller (e.g., using processor 420, memory 430, storage component 440, input component 450, output component 460, communication interface 470 and/or the like) may generate a composite video frame based on the one or more processed video frames, as described above.

As further shown in FIG. 5, process 500 may include generating a video frame mask based on the composite video frame (block 550). For example, the controller (e.g., using processor 420, memory 430, storage component 440, input component 450, output component 460, communication interface 470 and/or the like) may generate a video frame mask based on the composite video frame, as described above.

As further shown in FIG. 5, process 500 may include obtaining additional video data that includes at least one additional video frame (block 560). For example, the controller (e.g., using processor 420, memory 430, storage component 440, input component 450, output component 460, communication interface 470 and/or the like) may obtain additional video data that includes at least one additional video frame, as described above.

As further shown in FIG. 5, process 500 may include causing the video frame mask to be applied to the at least one additional video frame (block 570). For example, the controller (e.g., using processor 420, memory 430, storage component 440, input component 450, output component 460, communication interface 470 and/or the like) may cause the video frame mask to be applied to the at least one additional video frame, as described above.

As further shown in FIG. 5, process 500 may include causing the at least one additional video frame to be processed using an object detection image processing technique and based on causing the video frame mask to be applied to the at least one additional video frame (block 580). For example, the controller (e.g., using processor 420, memory 430, storage component 440, input component 450, output component 460, communication interface 470 and/or the like) may cause the at least one additional video frame to be processed using an object detection image processing technique and based on causing the video frame mask to be applied to the at least one additional video frame, as described above.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

A controller of a work machine may use an object detection processing technique to detect non-work-machine objects in one or more images (e.g., a stream of video frames associated with video data) and present an alert to an operator of the work machine based on detecting a non-work-machine object. However, in some cases, the one or more images may include one or more areas that are associated with a component of the work machine, such as an implement of the work machine. In these cases, the one or more areas may interfere with an ability of the controller to accurately detect non-work-machine objects using the object detection processing techniques.

For example, the controller may incorrectly identify the component as a non-work-machine object. This may cause a false positive alert to be presented to the operator. As another example, the controller may fail to identify a non-work-machine object that appears in close proximity to the component in the one or more images. This may cause no alert to be presented to the operator when an alert should be presented. The presentation of false-positive alerts and/or failure to present relevant alerts to the operator may impact the operator's ability to effectively operate the work machine. This may cause the operator to operate the work machine in a way that causes the work machine and/or the component to collide with a non-work-machine object, which may damage the work machine, other work machines, other vehicles, and/or other property.

Accordingly, some implementations described herein provide a controller that processes a plurality of video frames included in video data to determine an apparent motion of each pixel of one or more pixels or each group of pixels of one or more groups of pixels of each video frame of the plurality of video frames. The controller may select one or more processed video frames, of the plurality of processed video frames, that correspond to a duration of time and may generate a composite video frame based on the one or more processed video frames. The controller may generate a video frame mask based on the composite video frame and may obtain additional video data that includes at least one additional video frame. The controller may cause the video frame mask to be applied to the at least one additional video frame and may cause the at least one additional video frame to be processed using an object detection image processing technique.

In this way, based on motion information, the controller excludes a component of a work machine from a video frame. This may improve the accuracy and/or reliability of the controller to detect a non-work-machine object using an object detection image processing technique as a result of the component being excluded from the video frame. This may enable the controller to present relevant and/or timely alerts regarding non-work-machine objects to an operator of the work machine, which may cause the operator to operate the work machine in a such a way that causes the work machine and/or the component to avoid colliding with the non-work-machine objects. Additionally, or alternatively, this may enable the controller to automatically control a path of motion of the work machine and/or the component, which may cause the work machine and/or the component to avoid colliding with the non-work-machine objects. This may reduce a likelihood that the work machine, other work machines, other vehicles, other property and/or the like are damaged.

What is claimed is:

1. A method, comprising:
   obtaining, by a device, video data that includes a plurality of video frames;
   processing, by the device, the plurality of video frames to determine an apparent motion of each pixel of one or more pixels or each group of pixels of one or more groups of pixels of each video frame of the plurality of video frames;
   selecting, by the device, one or more processed video frames, of the plurality of processed video frames, that correspond to a duration of time;
   generating, by the device, a composite video frame based on the one or more processed video frames;
   determining, by the device, an area of the composite video frame that indicates an apparent motion that corresponds to a magnitude and direction of motion of an implement of a work machine;
   generating, by the device, a video frame mask based on the area of the composite video frame;
   obtaining, by the device, additional video data that includes at least one additional video frame;
   causing, by the device, the video frame mask to be applied to the at least one additional video frame; and
   causing, by the device, the at least one additional video frame to be processed using an object detection image processing technique and based on causing the video frame mask to be applied to the at least one additional video frame.

2. The method of claim 1, wherein processing the plurality of video frames comprises:
   processing the plurality of video frames using an optical flow image processing technique.

3. The method of claim 1, wherein generating the composite video frame comprises:
   identifying, for each pixel or each group of pixels of the composite video frame, a respective corresponding pixel or a respective corresponding group of pixels in each processed video frame of the one or more processed video frames;
   determining an average apparent motion of the corresponding pixels or the corresponding group of pixels; and
   causing a parameter associated with the pixel or the group of pixels of the composite video frame to have a value that indicates the average apparent motion.

4. The method of claim 1, further comprising:
   determining at least one area associated with a lack of motion of the implement; and
   generating another mask based on the at least one area.

5. The method of claim 1, further comprising:
obtaining information concerning motion of the implement; and
determining the magnitude and direction of motion of the implement based on the information concerning motion of the implement.

6. The method of claim 1, wherein causing the video frame mask to be applied to the at least one additional video frame comprises:
combining the at least one additional video frame and the video frame mask.

7. The method of claim 1, wherein the additional video frame includes one or more pixels or one or more groups of pixels,
wherein causing the video frame mask to be applied to the at least one additional video frame comprises:
causing a pixel, of the one or more pixels, to change color based on the video frame mask; or
causing a group of pixels, of the one or more groups of pixels, to change color based on the video frame mask.

8. The method of claim 1, wherein, when the video frame mask is applied, the video frame mask excludes the implement from the at least one additional video frame.

9. A device, comprising:
one or more memories; and
one or more processors, communicatively coupled to the one or more memories, to:
obtain video data that includes a plurality of video frames;
process the plurality of video frames to determine an apparent motion of each pixel of one or more pixels or each group of pixels of one or more groups of pixels of each video frame of the plurality of video frames;
select one or more processed video frames, of the plurality of processed video frames, that correspond to a duration of time;
generate a composite video frame based on the one or more processed video frames;
determine at least one area of the composite video frame that indicates an apparent motion that corresponds to a magnitude and direction of motion of an implement of a work machine;
generate a video frame mask based on the at least one area of the composite video frame;
obtain additional video data that includes at least one additional video frame;
cause the video frame mask to be applied to the at least one additional video frame; and
cause the at least one additional video frame to be processed using an object detection image processing technique and based on causing the video frame mask to be applied to the at least one additional video frame.

10. The device of claim 9, wherein the one or more processors, when processing the plurality of video frames, are to:
process the plurality of video frames using a dense optical flow image processing technique or a coarse optical flow image processing technique.

11. The device of claim 9, wherein the one or more processors, when determining the at least one area of the composite video frame, are to:
identify one or more areas of the composite video frame that have at least one pixel or at least one group of pixels that that indicate a magnitude and direction of movement that correlates to the implement being raised or lowered at a particular speed,
wherein the magnitude and direction of movement is the magnitude and direction of motion, and
wherein the one or more areas of the composite video frame include the at least one area of the composite video frame; and
determine the at least one area of the composite video frame based on identifying the one or more areas of the composite video frame that have the at least one pixel or the at least one group of pixels.

12. The device of claim 9, wherein the one or more processors, when causing the video frame mask to be applied to the at least one additional video frame, are to:
cause, for each pixel of a plurality of pixels or each group of pixels of a plurality of groups of pixels included in the at least one additional video frame that corresponds to a pixel or a group of pixels of the video frame mask, a parameter associated with the pixel or the group of pixels included in the at least one additional video frame to have a particular value.

13. The device of claim 9, wherein the one or more processors are further to:
obtain information concerning motion of the implement; and
determine the magnitude and direction of motion of implement based on the information concerning motion of the implement.

14. A work machine, comprising:
an implement;
a camera device; and
a control device to:
obtain video data that includes a plurality of video frames from the camera device;
process the plurality of video frames to determine an apparent motion of each pixel of one or more pixels or each group of pixels of one or more groups of pixels of each video frame of the plurality of video frames;
select one or more processed video frames, of the plurality of processed video frames, that correspond to a duration of time;
generate a composite video frame based on the one or more processed video frames;
determine an area of the composite video frame that indicates an apparent motion that corresponds to a magnitude and direction of motion of the implement;
generate a video frame mask based on the area of the composite video frame;
obtain additional video data that includes at least one additional video frame from the camera device;
cause the video frame mask to be applied to the at least one additional video frame; and
cause the at least one additional video frame to be processed using an object detection image processing technique and based on causing the video frame mask to be applied to the at least one additional video frame.

15. The work machine of claim 14, wherein the control device, when processing the plurality of video frames, is to:
identify, for a video frame of the plurality of video frames, a plurality of pixels or a plurality of groups of pixels included in the video frame; and
determine, for each pixel of the plurality of pixels or each group of pixels of the plurality of groups of pixels, a magnitude and a direction of movement of each pixel or each group of pixels.

16. The work machine of claim 14, wherein the control device is further to:
  determine at least one area associated with a lack of motion;
  generate another mask based on the at least one area.

17. The work machine of claim 14, wherein the control device is further to:
  determine, based on one or more control instructions or sensor data, a direction of motion associated with the work machine;
  determine at least one area that does not correspond to the direction of motion associated with the work machine; and
  generate another mask based on the at least one area.

18. The work machine of claim 14, wherein the control device is further to:
  determine, based on one or more control instructions or sensor data, the magnitude and direction of motion of the implement.

19. The work machine of claim 14, wherein the control device, when causing the video frame mask to be applied to the at least one additional video frame, is to:
  cause at least one area of the at least one additional video frame that corresponds to the video frame mask to have a particular color; and
  cause one or more edges of the at least one area to be blurred.

20. The work machine of claim 14, wherein the control device, when causing the at least one additional video frame to be processed using the object detection image processing technique, is to:
  process the at least one additional video frame using the object detection image processing technique to detect an object;
  determine whether the object is in a path of motion of the work machine or the implement; and
  cause, based on determining that the object is in the path of motion of the work machine or the implement, an alert to be displayed on a display of the work machine.

* * * * *